(12) United States Patent
Kim

(10) Patent No.: US 9,104,378 B2
(45) Date of Patent: Aug. 11, 2015

(54) METHOD FOR PROCESSING DATA AND ELECTRONIC DEVICE THEREOF

(71) Applicant: Samsung Electronics Co., Ltd., Gyeonggi-do (KR)

(72) Inventor: Sang-Ho Kim, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/469,374

(22) Filed: Aug. 26, 2014

(65) Prior Publication Data

US 2015/0058022 A1    Feb. 26, 2015

(30) Foreign Application Priority Data

Aug. 26, 2013   (KR) .................. 10-2013-0101164

(51) Int. Cl.
| | | |
|---|---|---|
| *G11B 21/08* | (2006.01) | |
| *G06F 3/16* | (2006.01) | |
| *G10L 21/12* | (2013.01) | |
| *G10L 25/87* | (2013.01) | |
| *G06F 3/041* | (2006.01) | |
| *G10L 25/84* | (2013.01) | |
| *G06F 3/147* | (2006.01) | |

(52) U.S. Cl.
CPC ................ *G06F 3/167* (2013.01); *G06F 3/041* (2013.01); *G06F 3/147* (2013.01); *G10L 21/12* (2013.01); *G10L 25/84* (2013.01); *G10L 25/87* (2013.01)

(58) Field of Classification Search
CPC ......... G06F 3/167; G06F 3/147; G06F 3/041; G10L 21/12; G10L 25/87; G10L 25/84; G10L 15/265; G10L 15/22; G08C 17/02
USPC ........................................ 369/30.18; 704/275
See application file for complete search history.

(56) References Cited

U.S. PATENT DOCUMENTS 8,769,634 B2 *   7/2014   Sidi et al. ........................ 726/4
2014/0340204 A1 *  11/2014   O'Shea et al. ............. 340/12.54

FOREIGN PATENT DOCUMENTS

KR    1020060128212    12/2006

\* cited by examiner

*Primary Examiner* — Ali Neyzari
(74) *Attorney, Agent, or Firm* — The Farrell Law Firm, P.C.

(57) ABSTRACT

An operation method of an electronic device is provided. The method includes detecting audio information from all or some of media data, determining a setting duration as at least one duration which satisfies a reference condition using the audio information, and displaying the setting duration on a display.

22 Claims, 12 Drawing Sheets

METHOD FOR PROCESSING DATA AND ELECTRONIC DEVICE THEREOF

PRIORITY

This application claims priority under 35 U.S.C. §119(a) to a Korean Patent Application filed in the Korean Intellectual Property Office on Aug. 26, 2013 and assigned Serial No. 10-2013-0101164, the entire contents of which are incorporated herein by reference.

BACKGROUND

1. Field of the Invention

The present invention generally relates to a method for storing information in data and displaying the stored information, and an electronic device thereof.

2. Description of the Related Art

An electronic device outputs audio information included in media data through an auxiliary device such as a speaker. In playing the media data, according to the time at which the audio information is recorded, the electronic device outputs the inputted audio information as it is.

The electronic device can distinguish the source of media data through audio information such as a frequency, a waveform, the amplitude, and a volume stored in the media data. The electronic device can detect audio information inputted to the electronic device and match the detected audio information with the stored source of the media data.

The electronic device has a problem in which, at recording, media data is recorded including audio information having an undesired frequency or tone such as a noise or a voice of a specified person, because the audio information is recorded in a silence duration. At playback, the recorded media data is outputted including the audio information, because the audio information is played without excluding the silence duration.

SUMMARY

The present invention has been made to address at least the above problems and disadvantages, and to provide at least the advantages described below. Accordingly, an aspect of the present invention is to provide a method for detecting audio information from all or some of media data, determining a setting duration as at least one duration which satisfies a reference condition using the audio information; and displaying the setting duration on a display.

Another aspect of the present invention is to provide a method for detecting audio information inputted to an electronic device according to previously set information during media data recording or during media data playback, and determining a duration corresponding to the previously set information in media data, and the electronic device thereof.

Another aspect of the present invention is to provide a method for processing one or more durations corresponding to previously set information determined in media data, and an electronic device thereof.

According to an aspect of the present invention, an operation method of an electronic device is provided. The method includes detecting audio information from all or some durations of media data, and determining, as a setting duration, at least one duration of the media data in which the audio information satisfies a reference condition.

According to another aspect of the present invention, an electronic device is provided, which includes a touchscreen configured to display setting information, a memory configured to store data about the setting information in the electronic device, at least one processor configured to detect audio information from all or some of media data, to determine a setting duration as at least one duration which satisfies a reference condition using the audio information, and to display the setting duration on a display.

According to another aspect of the present invention, an electronic device is provided, which includes a touchscreen for displaying setting information, a memory for storing data about the setting information in the electronic device, a data processing module for processing the setting information, and at least one processor for executing the processed setting information. The data processing module controls to detect audio information from all or some durations of media data, and determine, as a setting duration, at least one duration of the media data in which the audio information satisfies a reference condition.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Various embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the present invention throughout this specification.

In describing various embodiments of the present invention, an electronic device is described on a basis of a touchscreen capable of performing in one physical screen an input operation of an input device and a display operation of a display unit. Accordingly, although the display unit and the input device are separately illustrated in a device construction of various embodiments of the present invention, the display unit can be expressed to include the input device or the display unit can be expressed to indicate the input device.

Various embodiments of the present invention are not limited only to an electronic device including a touchscreen and are applicable to various electronic devices in which the display unit and the input device are physically separated and distinguished or which include only one of the display unit and the input device. Hereinafter, the electronic device with the touchscreen is an electronic device that includes a touchscreen including a touch input device and a display unit, a display unit including no touch input device, or a display unit including a touch input device.

An electronic device 100 can include a mobile communication user device, a Personal Digital Assistant (PDA), a Personal Computer (PC), a laptop computer, a smartphone, a smart Television (TV), a netbook computer, a Mobile Internet Device (MID), an Ultra Mobile PC (UMPC), a tablet PC, a mobile pad, a media player, a handheld computer, navigator, a smart watch, a Head Mount Display (HMD), and an MPEG Audio Layer 3 Player (MP3P).

In describing various embodiments of the present invention in detail, when it is mentioned that any constituent element is 'connected' or 'accessed' to another constituent element, it should be understood that any constituent element can be directly connected or accessed to another constituent element or the third constituent element can exist in between the two constituent elements. In contrast, when it is mentioned that any constituent element is 'directly connected' or 'directly accessed' to another constituent element, it should be understood that the third constituent element does not exist in between the two constituent elements.

Figure 1:
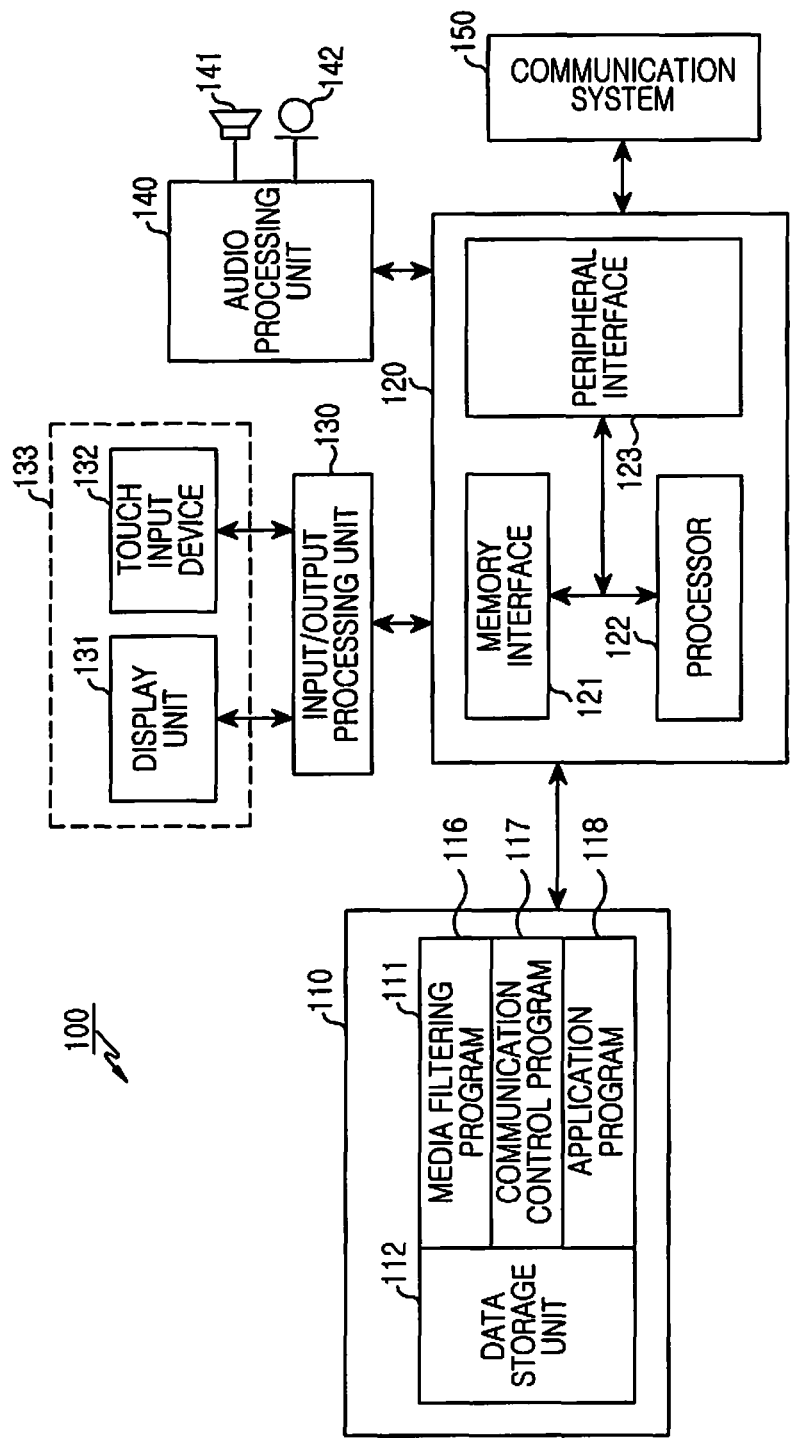
FIG. 1 is a block diagram illustrating a construction of an electronic device according to an embodiment of the present invention.

FIG. 1 is a block diagram illustrating a construction of an electronic device according to an embodiment of the present invention.

As illustrated in FIG. 1, the electronic device 100 includes a memory 110 and a processor unit 120, and can include peripheral devices such as an input/output processing unit 130, a display unit 131, a touch input device 132, an audio processing unit 140, and a communication system 150, and other peripheral devices.

The memory 110 includes a program storage unit 111 storing a program for controlling the operation of the electronic device 100, and a data storage unit storing data generated during program execution. The memory 110 stores data created in the program by an operation of a processor 122. The data storage unit 112 predefines operation information for enabling the electronic device 100 to control other electronic devices, and constructs a database of a table or list form, and stores the predefined operation information in the database of the table or list form.

The data storage unit 112 stores data constructed in various formats, in the electronic device 100. The electronic device 100 uses various units in determining the start and end of a setting duration during media data recording or playback. The electronic device 100 determines a time point of starting to input a designated audio feature as a starting point of the setting duration, and sets a time point of ending to input the designated audio feature as an ending point of the setting duration. The electronic device 100 stores time information of an event of determining a setting duration, and stores time information of a duration which is determined as the setting duration and in which audio information is inputted, together with the time information of the event. The electronic device 100 determines media data recording or playback time information corresponding to the starting point of the setting duration and media data recording or playback time information corresponding to the ending point of the setting duration, and matches the determined time information about the starting point and ending point of the setting duration and stores the matching result in a header or text of media data.

The electronic device 100 uses a track parameter of media data in determining a starting point and an ending point of a setting duration according to audio information inputted during media data recording or playback. The electronic device 100 determines a track parameter dividing media data recording duration and playback duration at a designated data size or in a designated time unit. The electronic device 100 assigns unique information of a designated form to each track parameter. The electronic device 100 determines the media data track parameter corresponding to the starting point of the setting duration and the media data track parameter corresponding to the ending point of the setting duration. Once detecting that the designated audio information corresponding to the setting duration is inputted during media data recording or playback, the electronic device 100 displays a start of the setting duration in the media data track parameter corresponding to a time point of starting to input the designated audio information. Once no longer detecting that the designated audio information corresponding to the setting duration is inputted, the electronic device 100 displays an end of the setting duration in the media data track parameter corresponding to a time point of ending to input the designated audio information.

When the electronic device 100 performs a function of recording of media data and sets a setting duration for inputted audio information, the electronic device 100 uses time information, track parameter information, or the time information and the track parameter information together.

The program storage unit 111 includes a media filtering program 116, a communication control program 117, and at least one application program 118. The programs included in the program storage unit 111 are composed of sets of instructions and thus may be expressed as instruction sets. The application program 118 can include a software constituent element for at least one application program installed in the memory 110 of the electronic device 100.

The media filtering program 116 controls to filter audio information inputted when the electronic device 100 records media data. When the inputted audio information includes a duration having a previously stored (i.e., designated) feature in the electronic device 100, the media filtering program 116 controls to determine a starting point of the duration having the feature to an ending point thereof, as a setting duration. When the electronic device 100 plays media data including one or more setting durations, the electronic device 100 controls to, instead of not outputting the setting durations, connect the setting durations just before starting points and just after ending points and to output the connected setting durations. In other words, when playing the media data, the electronic device 100 controls to output the remnant duration except the setting durations. The electronic device 100 controls to store information about the determined setting duration in a header or text of the media data. When playing the media data, the electronic device 100 controls to display the information about the setting duration in a region displaying a media data playback state.

The communication control program 117 includes at least one software constituent element for controlling communication with at least one other electronic device using the communication system 150 or a short-range wireless communication module. The communication control program 117 searches other electronic devices for connecting communication. If the other electronic device for communication connection is found, the communication control program 117 establishes a connection for communication with the other electronic device. And then, the communication control program 117 controls to perform a performance search and session establishment procedure with the connected other electronic device and transmit/receive data (e.g., packet data) with the other electronic device through the communication system 150.

At least one memory 110 can be included in the electronic device 100. According to the use, the memory 110 performs only a function of the program storage unit 111, only a function of the data storage unit 112, or functions of both the program storage unit 111 and the data storage unit 112. The division of physical regions within the memory 110 varies based on a characteristic of the electronic device 100.

The processor unit 120 includes a memory interface 121, at least one processor 122, and a peripheral interface 123. Here, the memory interface 121, the at least one processor 122, and the peripheral interface 123, may be integrated as at least one circuit or be implemented as separate constituent elements.

The memory interface 121 controls the access of constituent elements such as the processor 122 and the peripheral interface 123, to the memory 110.

The peripheral interface 123 controls the connection of the memory interface 121 and the processor 122 with an input/output peripheral device of the electronic device 100.

By using at least one software program, the processor 122 controls the electronic device 100 to provide various multimedia services, and confirms a User Interface (UI) operation of the electronic device 100 by displaying the UI operation on the display unit 131 through the input/output processing unit 130, and controls the touch input device 132 to provide a service of receiving an instruction from the external of the electronic device 100. The processor 122 controls to execute at least one program stored in the memory 110 and to provide a service corresponding to the executed program.

The input/output processing unit 130 provides an interface between the peripheral interface 123 and the input/output device 133 which includes the display unit 131 and the touch input device 132.

The display unit 131 receives status information of the electronic device 100, an external input character, and a picture image of a moving picture or still picture from the processor unit 120, and displays them.

The touch input device 132 provides input data generated by user's selection to the processor unit 120 through the input/output processing unit 130. The touch input device 132 is composed of only a control button or be composed of a keypad so as to receive control data from the external of the electronic device 100.

The touch input device 132 is included in the input/output device 133 together with the display unit 131 such that input/output can be performed in one screen. In this case, the touch input device 132 used in the input/output device uses one or more of a capacitive method, a resistive (pressure sensitive) method, an infrared method, an electromagnetic induction method, and an ultrasonic method.

An input method of the touch input device 132 is a method of processing to input an instruction when an input means is located within a predetermined distance from the touchscreen 133, or a method of inputting by directly touching the touchscreen 133. Terms of hovering touch, floating touch, indirect touch, proximity touch, and non-contact input can be used.

The input/output device 133, which is a device physically combining the touch input device 132 with the display unit 131 in one screen, is a touchscreen capable of inputting an instruction by touching a screen construction displayed on the display unit 131 in an operation of the electronic device 100. The touchscreen performs all roles of the display unit 131 displaying the UI operation of the electronic device 100 and the touch input device 132 inputting an external instruction to the electronic device 100. Hereinafter, the input/output device 133 is the touchscreen 133 including the display unit 131 and the touch input device 132 in the following description. Various embodiments of the present invention illustrate the touchscreen 133 composed of a complex touch panel in which a touch panel and a pen touch panel are embodied together, and can be described on a basis of this. The touchscreen 133 of the electronic device 100 is not limited to the touchscreen composed of the complex touch panel and can be applied even to a touchscreen to which a pen touch panel enabling only a pen touch is applied.

The audio processing unit 140 provides an audio interface between a user and the electronic device 100 through a speaker 141 and a microphone 142.

The communication system 150 performs a communication function. The communication system 150 performs communication with other electronic devices using one or more of mobile communication using a base station, wired communication, and satellite communication, or performs short-range wireless communication in connection with a short-range wireless communication module.

The short-range wireless communication module performs communication with other electronic devices using at least any one of short-range wireless communication (e.g., Infrared Data Association (IrDA) communication, Bluetooth communication, Bluetooth Low Energy (BLE) communication being one embodiment of the Bluetooth communication, Wireless Fidelity (WiFi) communication, Near Field Communication (NFC) communication, Zigbee communication, and Ultra Wide-Band (UWB) communication), Wireless Local Area Network (WLAN) communication, and wired communication. The communication system 150 and the short-range wireless communication module are separated in the following description, but the communication system 150 and the short-range wireless communication module may perform communication in one communication system module. In describing an embodiment of the present invention, an IrDA communication module and the short-range wireless communication module are also separated.

One or more programs or one or more constituent elements of the electronic device 100 may perform an operation by one or more control modules controlled by the processor 122.

In describing an embodiment of the present invention, displaying in the electronic device 100 or outputting to the electronic device 100 are terms representing a method of displaying a moving picture, a still picture, or a Graphical User Interface (GUI) operation on the touchscreen 133 of the electronic device 100 or outputting a signal sound or voice audio to the speaker 141. In the following description, the terms of displaying and outputting are used as the same meaning, and are separately described when being needed to be distinguished.

In describing an embodiment of the present invention, the electronic device 100 performs roles of one or more other electronic devices (e.g., a 1st electronic device, a 2nd electronic device, a 3rd electronic device, and the like). The one or more other electronic devices (e.g., the 1st electronic device, the 2nd electronic device, the 3rd electronic device, and the like) are constructed to be the same to or similar with the electronic device 100 or to include part of the electronic device 100.

Figure 2A:
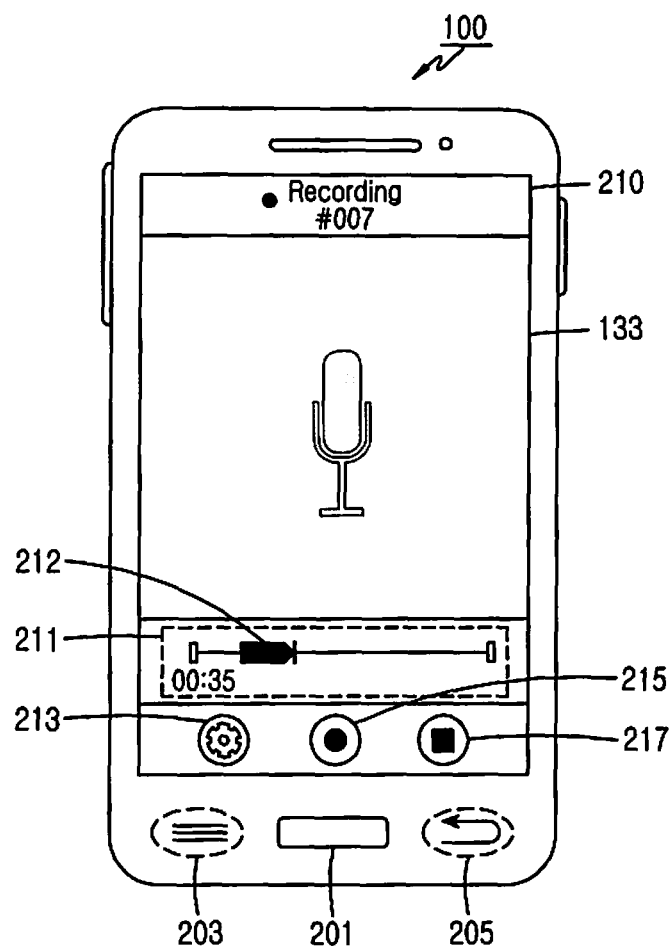
FIGS. 2A and 2B are diagrams illustrating an operation of determining a setting duration in media data during media data recording in an electronic device according to an embodiment of the present invention.
Figure 2B:
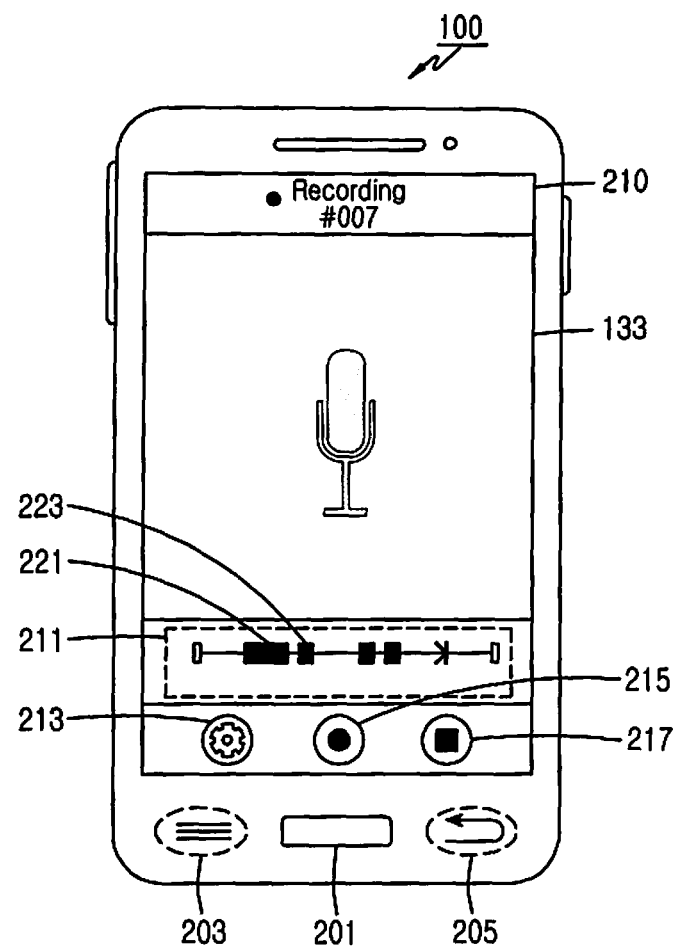

FIGS. 2A and 2B are diagrams illustrating an operation of determining a setting duration in media data during media data recording in an electronic device according to various an embodiment of the present invention.

The electronic device 100 inputs audio information of the electronic device 100 and/or audio information near the electronic device 100 through an auxiliary input device capable of inputting the audio information such as the microphone 142.

Referring to FIG. 2A, the speaker 141 (not shown) capable of outputting a sound is included at an upper side of the electronic device 100, and a button being one of input devices capable of inputting an instruction by a click is included at a lower side of the electronic device 100, and a touch button 203 or 205 capable of inputting an instruction by a touch is included in a fixed location of the electronic device 100. The electronic device 100 includes at least one microphone 142 (not shown) capable of inputting a sound outside the electronic device 100, in a location exposed outside the electronic device 100 to input the sound. The electronic device 100 includes the display unit 131 (not shown) or touchscreen 133 in front, and can display a UI operation of the electronic device through the display unit 131 or touchscreen 133. The electronic device 100 inputs an instruction through an operation of touching the touchscreen 133, and performs a function or operation of the electronic device 100 corresponding to the inputted instruction. The electronic device 100 can include the speaker 141, microphone 142, the button 201, the touch button 203 or 205, and the touchscreen 133 in the same location as described above or in different locations. Hereinafter, the electronic device 100 is described including the touchscreen 133.

The electronic device 100 displays one screen 210 of a program capable of controlling recording of media data on the touchscreen 133. The electronic device 100 provides some or all functions of an independent program such as the media filtering program 116 capable of recording or playing the media data to the screen (e.g., recording control screen 210), or provides some functions of a program module connected with one or more programs to the screen (e.g., recording control screen 210). The electronic device 100 displays some functions included in the media filtering program 116. If selecting (e.g., selecting through touch or hovering) a recording icon 215 displayed on the recording control screen 210, the electronic device 100 records audio information inputted through the microphone 142 and/or audio information generated in the electronic device 100, as media data. When selecting the recording icon 215 during media data recording, the electronic device 100 pauses the media data recording operation. When selecting a recording stop icon 217 during the media data recording, the electronic device 100 stops the media data recording operation, and stores recorded media data in the memory 110. If selecting a setting icon 213, the electronic device 100 sets a condition of recording or playing media data in the electronic device 100. Through the setting of the electronic device 100, the condition is controlled to set information such as a range of a white noise determined as a skip duration in the media data recording operation, a frequency range of audio information determined as a setting duration, and a tone range of an acquired frequency determined as the setting duration. If the electronic device detects audio information of a duration corresponding to the setting from the media data being recorded, the electronic device 100 determines the duration as the setting duration, and makes a mark corresponding to the setting duration.

The set information is applied not only in the media data recording operation but also during playing of media data stored in the electronic device 100.

If the electronic device 100 selects the recording icon 215 and generates a recording event, the electronic device 100 records information acquired by the electronic device 100 as media data. The electronic device 100 displays a recording state display information indicator 211 for displaying a media data recording state. If the electronic device 100 detects an audio feature designated to setting in an operation of recording audio information as media information, the electronic device 100 displays a corresponding duration as a setting duration 212. In determining a setting duration of audio information, if the electronic device 100 detects a designated audio feature, the electronic device 100 determines a corresponding duration as the setting duration. If the electronic device 100 inputs other audio information together with the designated audio feature, the electronic device 100 does not determine a corresponding duration as the setting duration. If inputting the other audio information together with the designated audio feature, the electronic device 100 selectively determines a duration of audio information (e.g., corresponding frequency region) only about the designated audio feature as the setting duration, instead of determining a duration of the designated audio feature as the setting duration. The electronic device 100 skips, without playing, the displayed setting duration at the time of playing recorded media data.

Referring to FIG. 2B, the electronic device 100 determines one or more setting durations according to audio information inputted to media data being recorded. The electronic device 100 starts to record media data by selecting the recording icon 215. The electronic device 100 detects that designated audio information is inputted during recording. Here, the designated audio information is one or more audio information among audio information of, for example, a designated frequency range of generated within the electronic device 100, audio information of a designated frequency range inputted to the microphone 142 (not shown), audio information inputted at a volume smaller than a designated volume, and audio information of a frequency range having a designated feature (e.g., audio information of a unique frequency range of a voice of a designated person). If the electronic device 100 detects the designated audio information according to the aforementioned method, the electronic device 100 displays a setting duration 221 in a location corresponding to a duration in which the designated audio information of the recording state display information indicator 211 is inputted. In recording media data, if detecting a plurality of inputted designated audio information, the electronic device 100 displays each setting duration (i.e., setting duration marks 221 and 223 displayed in the recording state display information indicator 211) in locations corresponding to durations in which the designated audio information are inputted. The electronic device 100 stores information about the setting durations 221 and 223 displayed in the recording state display information indicator 211 and audio information recorded in the setting durations, in a header or text of the media data.

Figure 3A:
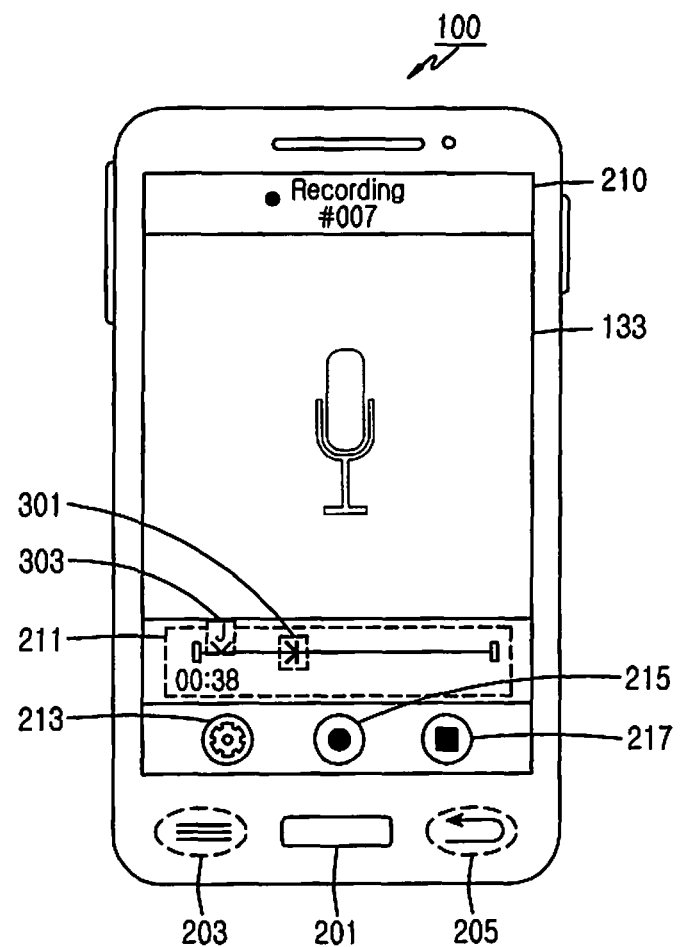
FIGS. 3A and 3B are diagrams illustrating an operation of displaying designated audio information detected during media data recording in an electronic device according to an embodiment of the present invention.
Figure 3B:
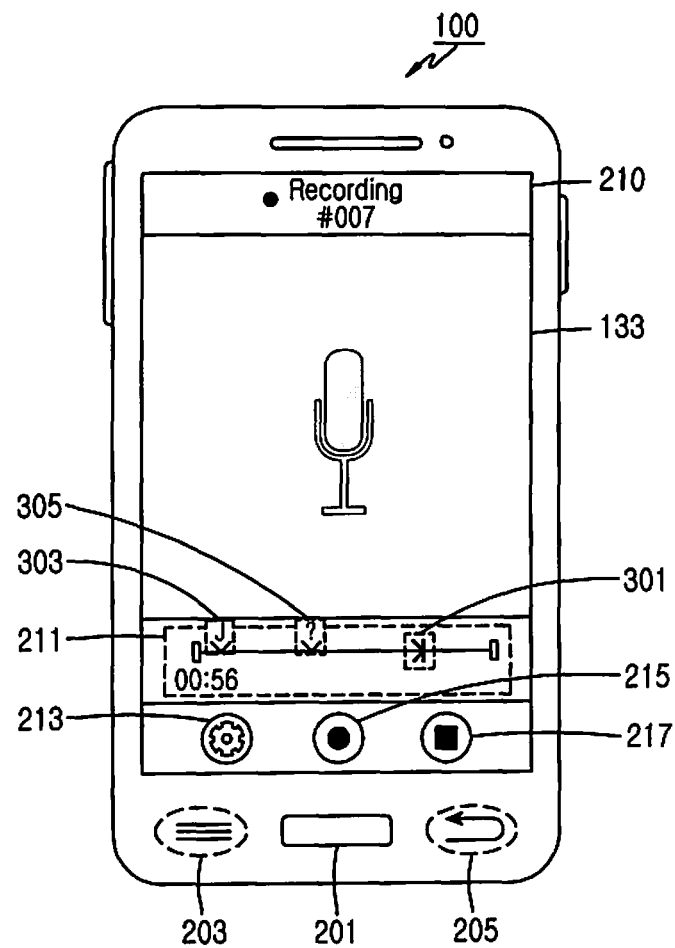

FIGS. 3A and 3B are diagrams illustrating an operation of displaying designated audio information detected during media data recording in an electronic device according to an embodiment of the present invention.

When the electronic device 100 detects that designated audio information is inputted during media data recording, if the designated audio information has unique information about the audio information designated to a memory of the electronic device 100, the electronic device 100 displays a corresponding mark. Here, the unique information is identification information corresponding to designated audio data.

Referring to FIG. 3A, the electronic device 100 detects that designated audio information is inputted during media data recording. When the designated audio information is audio information having unique information, the electronic device 100 displays the unique information in the recording state display information indicator 211. The electronic device 100 stores voice information of 'Joseph' as one designated audio information, and sets 'J' as unique information of the designated audio information of 'Joseph'. The electronic device 100 detects that the audio information of 'Joseph' is inputted during media data recording. The electronic device 100 displays the unique information 'J' 303 of 'Joseph' in a location of the recording state display information indicator 211 corresponding to a time point of starting to input the audio information of 'Joseph'. The electronic device 100 stores information about a duration in which the audio information of 'Joseph' is inputted, though not displayed in the recording state display information indicator 211. The electronic device 100 determines a setting duration according to setting. When selecting the unique information stored in the memory 110 of the electronic device 100, the electronic device 100 determines as the setting duration a duration in which the audio information of 'Joseph' is inputted to corresponding media data, and displays the duration in which the audio information of 'Joseph' is inputted in the recording state display information indicator 211 by a mark of the setting duration.

Even after displaying the unique information (e.g., 'J' of 'Joseph') or corresponding mark for the designated voice information including one or more unique information, determining the setting duration, or displaying the determined setting duration in the recording state display information indicator 211, the electronic device 100 continuously performs a media data recording operation 301.

Referring to FIG. 3B, the electronic device 100 inputs one or more designated audio information while recording media data, and sets a setting duration according to each inputted audio information, and displays unique information corresponding to the setting duration. When the electronic device detects that designated 2nd audio data is inputted while designated 1st audio information having unique information of 'J' 303 is inputted or after the input of the designated 1st audio information having the unique information of 'J' 303 is ended, if the 2nd audio information is audio information not having unique information, the electronic device 100 displays a mark '?' in the recording state display information indicator 211. The mark '?' is used as a mark for representing a non-confirmed voice. According to one exemplary embodiment, the electronic device 100 stores specific voice information as one designated audio information and may not set unique information of the designated audio information. The electronic device 100 detects that the designated audio information not having the unique information is inputted during media data recording. The electronic device 100 displays a mark '?' 305 about a non-confirmed voice in a location of the recording state display information indicator 211 corresponding to a time point of starting to input the audio information not having the unique information. Though not displayed in the recording state display information indicator 211, the electronic device 100 stores information about a duration in which audio information of a non-confirmed voice (i.e., a voice not having unique information) is inputted. The electronic device 100 determines a setting duration according to setting. When selecting a duration of audio information of one or more non-confirmed voices stored in the memory 110 of the electronic device 100, the electronic device 100 determines the duration in which the audio information displaying the one or more marks '?' is inputted to corresponding media data as a setting duration, and displays the duration corresponding to the mark '?' 305 in which the audio information of the non-confirmed voice is inputted in the recording state display information indicator 211 by a mark of the setting duration.

Even after displaying the mark '?' 305 for one or more non-confirmed designated voice information, determining the setting duration, or displaying the determined setting duration in the recording state display information indicator 211, the electronic device 100 continuously performs a media data recording operation 301.

Figure 4:
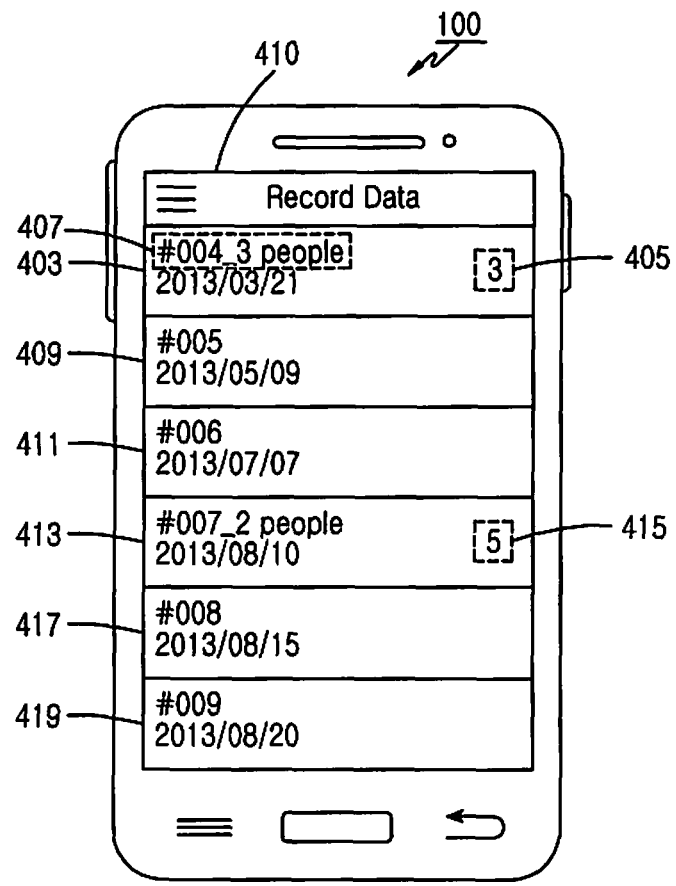
FIG. 4 is a diagram illustrating an operation of displaying recorded media data in an electronic device according to an embodiment of the present invention.

FIG. 4 is a diagram illustrating an operation of displaying recorded media data in an electronic device according to an embodiment of the present invention.

The electronic device 100 displays one or more media data in a list 410. The list 410 displaying the one or more pieces of media data displays recorded media data. The list 410 is not limited to displaying the recorded media data and may be a list displaying media data of a format playable in the electronic device 100.

Referring to FIG. 4, the electronic device 100 displays one or more media data playable in the electronic device 100, in the media data display list 410. The electronic device 100 confirms one or more setting durations stored in the media data, and displays information about at least one of the confirmed setting durations in a region displaying information about the corresponding media data (e.g., 405 or 407 of FIG. 4).

The electronic device 100 displays information about '#004' media data 403 to information about '#009' media data 419, which include one or more setting durations, in the media data display list 410 in the same method as a method of displaying other media data including no setting duration. In displaying the information about the media data, the electronic device 100 displays information such as a name of the media data, a date of creating the media data, and the number of setting durations stored in the media data. In displaying the information about the '#004' media data 403 in the media data display list 410, the electronic device 100 displays information about a setting duration stored in the media data 403, such as a name '#004' of the media data 403, a date '2013/03/21' of creating the media data 403, and the number '3' 405 of setting durations stored in the media data 403, together with the information about the media data 403. Also, in displaying the number of designated audio information included in the '#004' media data, the electronic device 100 can display the number of designated audio information together with the name of the '#004' media data 403, like '#004_3 people'. In displaying information about '#007' media data 413 in the media data display list 410, the electronic device 100 displays information about a setting duration stored in the media data 413, such as a name '#007' of the media data 413, a date '2013/08/10' of creating the media data 413, and the number '5' 415 of setting durations stored in the media data 413, together with the information about the media data 413. Also, in displaying the number of designated audio information included in the '#007' media data 413, the electronic device 100 can display the number of designated audio information together with the name of the '#007' media data 413, like '#007_2 people'.

Figure 5:
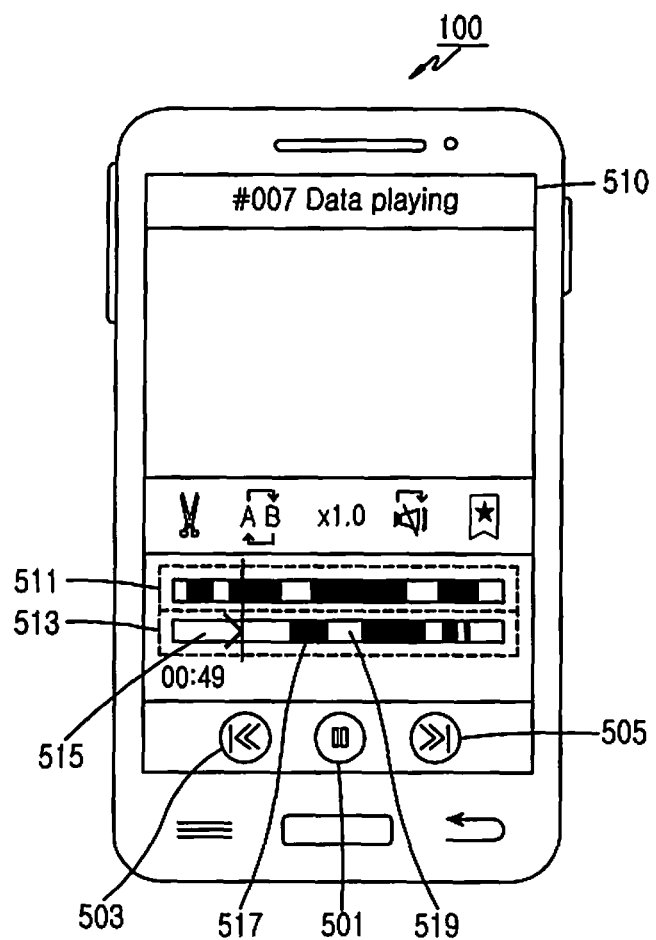
FIG. 5 is a diagram illustrating an operation of playing recorded media data in an electronic device according to an embodiment of the present invention.

FIG. 5 is a diagram illustrating an operation of playing recorded media data in an electronic device according to an embodiment of the present invention.

The electronic device 100 outputs audio information and/or video information included in stored media data. The electronic device 100 plays media data having a name of '#007' in the memory 110. The electronic device 100 displays a media data playback region 510 on the touchscreen 133. The electronic device 100 detects two designated audio information from the media data having the name of '#007', and displays playback state information indicators 511 and 513 about the detected two audio information. The electronic device 100 selects one or more of the displayed at least one playback state information indicators 511 and 513 and outputs the two audio information selected in the media data having the name of '#007'.

Referring to FIG. 5, the electronic device 100 selects the playback state information indicator 513 about one audio information among the playback state information indicators 511 and 513 about the two designated audio information, and the electronic device 100 plays the selected audio information. In outputting the audio information according to the selected playback state information indicator 513, the electronic device 100 outputs the remnant duration except a setting duration. According to the selected playback state information indicator 513, the electronic device 100 outputs a duration 515 in which the selected audio information is inputted according to order of time or according to order of a track parameter. If ending the outputting of the duration 515 in which the audio information is inputted, instead of outputting a setting duration 517, the electronic device 100 can output a duration 519 in which the following audio information is inputted first after the duration 515.

The electronic device 100 outputs a duration in which audio information before or after a playback time point is inputted, through a reverse icon 503 or a forward icon 505. The electronic device 100 outputs a playback time point corresponding to playback seconds [00:49] of the first audio information duration 515 in the selected playback state information indicator 513. When selecting the forward icon 505, the electronic device 100 stops the output of the first audio information duration 515 in which the corresponding playback time point is located, and outputs other audio information duration 519 located after skipping the following setting duration 517.

Figure 6A:
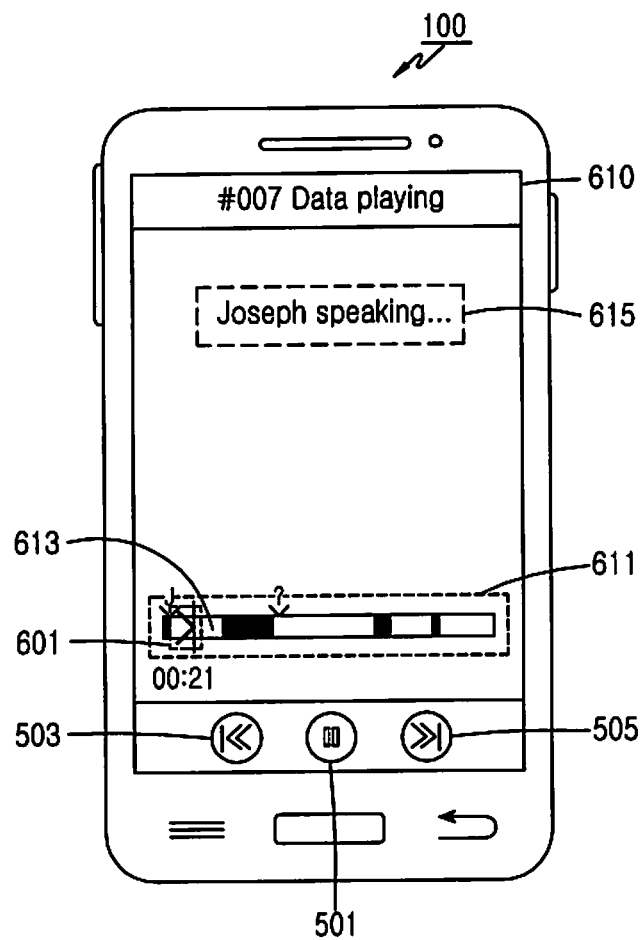
FIGS. 6A and 6B are diagrams illustrating an operation of playing recorded media data in an electronic device according to an embodiment of the present invention.
Figure 6B:
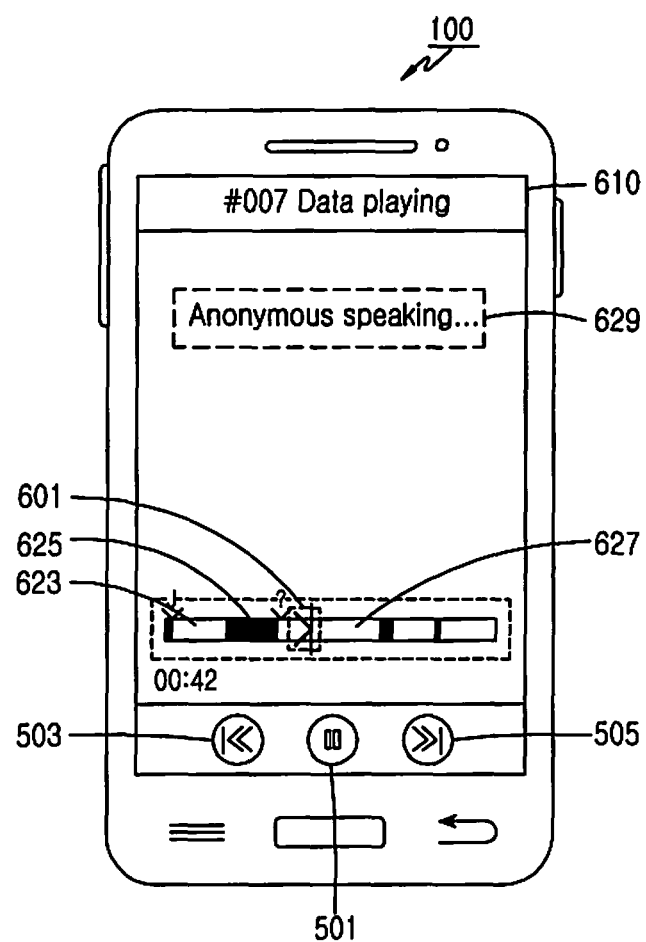

FIGS. 6A and 6B are diagrams illustrating an operation of playing recorded media data in an electronic device according to an embodiment of the present invention.

When recorded media data has unique information about designated audio information, while outputting the corresponding audio information, the electronic device 100 displays the unique information about the designated audio information in a designated location of a media data playback region 610 of the touchscreen 133.

Referring to FIG. 6A, the electronic device 100 plays '#007' media data, and displays a '#007' media data playback state information indicator 611 in the media data playback region 610 of the touchscreen 133. The electronic device 100 outputs a playback time point 601 corresponding to [00:21] seconds in the first audio information duration 613 of the '#007' media data. If the first audio information duration 613 of the '#007 media data is designated audio information having unique information 'Joseph', the electronic device 100 displays information about a confirmed voice such as 'Joseph speaking' 615 in a designated location of the media data playback region 610 displayed on the touchscreen 133.

Referring to FIG. 6B, the electronic device 100 plays '#007' media data, and displays the '#007' media data playback state information indicator 611 in the media data playback region 610 of the touchscreen 133. The electronic device 100 ends the outputting of the first audio information duration 623 of the media data. The electronic device plays a continuously recorded audio information duration 625, which is set as a setting duration. Instead of outputting the audio information duration 625 set as the setting duration, the electronic device 100 outputs the following connected audio information duration 627. If ending the output of the first audio information duration 623 of the '#007' media data, instead of outputting the following connected setting duration 625, the electronic device 100 outputs the following connected audio information duration 627. If the following outputted audio information duration 627 is audio information inputted as a voice and has no designated unique information, the electronic device 100 determines the following outputted audio information duration 627 as non-confirmed designated voice information, and displays the non-confirmed designated voice information in a designated location of the media data playback region 610 displayed on the touchscreen 133, like 'Anonymous speaking' 629.

Figure 7A:
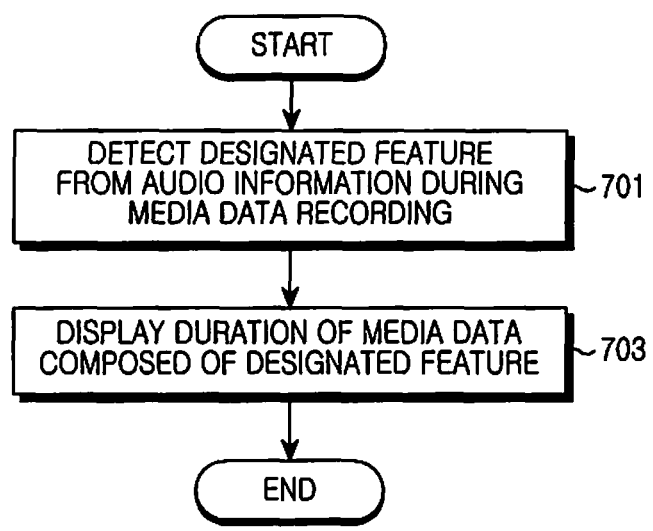
FIGS. 7A and 7B are flowcharts illustrating an operation of setting a duration to media data during media data recording in an electronic device according to an embodiment of the present invention.
Figure 7B:
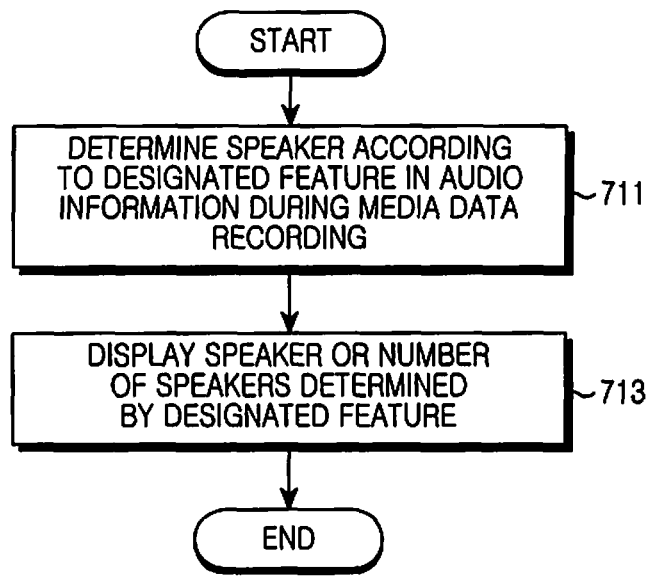

FIGS. 7A and 7B are flowcharts illustrating an operation of setting a duration to media data during media data recording in an electronic device according to an embodiment of the present invention.

Referring to FIG. 7A, the electronic device 100 detects a designated audio feature from audio information inputted during media data recording, and can set one or more durations composed of the designated audio feature.

In step 701, the electronic device 100 detects a designated audio feature from audio information inputted during media data recording. The electronic device 100 can detect an audio feature of a designated frequency range from the audio information inputted during the media data recording. The electronic device 100 can detect an audio feature having a designated frequency waveform from the audio information inputted during the media data recording. The electronic device 100 can detect an audio feature having a designated amplitude range from the audio information inputted during the media data recording. The designated audio feature can be detected by predefining one or more conditions in a media data recording setting step, and applying set data to filter inputted audio information.

In step 703, the electronic device 100 sets one or more durations of media data including the detected audio feature. The electronic device 100 can display information about one or more setting durations set to the media data and/or a designated mark in locations corresponding to the set setting durations of a recording state information indicator displaying a media data recording state or a playback state information indicator displaying a media data playback state.

Further, though not illustrated in FIG. 7A, the electronic device 100 can store the information about the one or more setting durations in the media data. The electronic device 100 can select the one or more setting durations among a plurality of setting durations stored in the media data and store the selected setting durations as information of a profile format. According to one exemplary embodiment, the electronic device 100 can store edited information of a profile format in the media data. The electronic device 100 can perform one or more operations during media data playback as well as in a media data recording operation.

Referring to FIG. 7B, the electronic device 100 detects a designated audio feature from audio information inputted during media data recording, and can confirm information matching with the designated audio feature.

In step 711, the electronic device 100 detects a designated audio feature from audio information inputted during media data recording, and confirms information matching with the designated audio feature. The electronic device can input a voice of a specified person, and can detect a feature from the inputted voice. The electronic device 100 can set a designated audio feature through the detected feature. When inputting a voice of a set specified person during media data recording, the electronic device 100 can detect a designated audio feature from the inputted voice, and can confirm previously inputted information about the set specified person. A setting process can be added. To acquire an audio feature becoming a reference of determination, the electronic device 100 can input and analyze a specific voice and acquire audio information becoming the audio feature, and can store information about the acquired audio feature and the inputted voice as information of a profile format.

In step 713, the electronic device 100 sets one or more durations of media data including the detected audio feature. The electronic device 100 stores audio features for a 1st person and a 2nd person. If voices of the 1st person and the 2nd person are inputted during media data recording, the electronic device detects the audio features of the respective persons. Based on the detected audio features, the electronic device 100 distinguishes the inputted voices of the 1st and 2nd persons and determines setting durations. The electronic device 100 determines one or more setting durations set to media data for one or more persons. In displaying information about recorded media data, the electronic device 100 displays the number of persons corresponding to voices that are confirmed through audio information of media data, and displays information about a person corresponding to setting information and/or a designated mark in a location corresponding to the set setting duration of a recording state information indicator displaying a media data recording state or a playback state information indicator displaying a media data playback state.

Further, though not illustrated in FIG. 7B, the electronic device 100 can store information about the set one or more setting durations in media data. The electronic device 100 can select one or more persons among a plurality of setting durations stored in the media data, and can define and store the setting duration corresponding to the selected person as information of a profile format. The electronic device 100 can store edited information of a profile format in the media data. The electronic device 100 can perform one or more operations during media data playback as well as in a media data recording operation.

Figure 8:
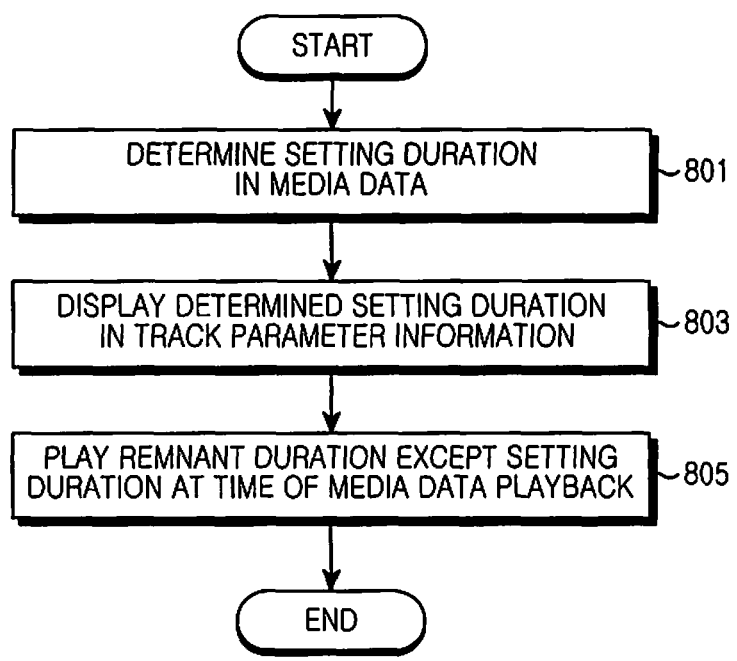
FIG. 8 is a flowchart illustrating an operation of processing a setting duration of media data in an electronic device according to an embodiment of the present invention.

FIG. 8 is a flowchart illustrating an operation of processing a setting duration of media data in an electronic device according to an embodiment of the present invention.

The electronic device 100 detects a setting duration defined in media data, and matches the detected setting duration to a track parameter of a media data playback state information indicator and display the matching result, and plays the remnant duration except the setting duration at the time of media data playback.

In step 801, the electronic device 100 sets one or more durations of media data including a detected audio feature. If audio information including a designated audio feature is inputted during media data recording, the electronic device 100 determines a corresponding duration. Also, if voices of a 1st person and a 2nd person are inputted during the media data recording through audio features stored for the 1st person and the 2nd person, the electronic device 100 detects audio features of the respective persons. Based on the detected audio features, the electronic device 100 distinguishes the inputted voices of the two persons and determines setting durations. The electronic device 100 determines one or more setting durations for one or more persons set to the media data.

In step 803, the electronic device 100 displays the determined one or more setting durations in the media data. The electronic device 100 can display information about the one or more setting durations set to the media data and/or a designated mark in locations corresponding to the set setting durations of a recording state information indicator displaying a media data recording state or a playback state information indicator displaying a media data playback state, and can store the displayed information in the media data. In displaying information about the recorded media data, the electronic device 100 can display the number of persons corresponding to voices which are confirmed through audio information of media data, and can display information about the persons corresponding to setting information and/or a designated mark in the locations corresponding to the set setting durations of the recording state information indicator displaying the media data recording state or the playback state information indicator displaying the media data playback state. The electronic device 100 can store information about the displayed setting durations in the media data. In storing the setting information in the media data, the electronic device 100 can determine a duration of the media data as a track parameter divided by a designated size or designated number, and can store information about a starting point of the setting information or an ending point of the setting information in the determined track parameter of a location corresponding to the starting point of the setting information or the ending point of the setting information.

In step 805, if the electronic device 100 plays the media data including the one or more setting durations, the electronic device 100 skips the setting durations and outputs the media data of the remnant duration. The electronic device 100 can store setting information about two or more persons as information of a profile format for voice information about the two or more persons. The electronic device 100 can define a duration including the voice of the corresponding person as a setting duration by selecting one or more persons, and can output the media data of the remnant duration except the setting information including the voice of the person selected at the time of media data playback. The electronic device 100 can selectively determine one or more setting information among the setting information determined in the media data, and can store the determined setting information in the media data. When playing the media data, the electronic device 100 can play, instead of playing the set setting information, the media data of the remnant duration.

According to an embodiment of the present application, a contents operation method of the electronic device 100 having a function of voice recording and playback includes the operations of starting voice recording at user input, storing voice data at the time of record ending, analyzing a recorded voice at the time of recorded data playback, displaying information about the recorded voice on the touchscreen 133 of the electronic device 100 so as to determine a silence duration of a voice in the operation of analyzing the recorded voice, playing recorded voice data in response to user input, and storing analyzed voice data and a list of playback durations of the voice data. The operation of playing the recorded data in response to the user input is characterized by skipping, instead of playing, a silence duration at the time of playing recorded voice data and continuously playing the remnant duration.

According to an embodiment of the present application, the operation of storing the voice data set a duration corresponding to a specific voice as a setting duration and record the duration in the recorded data, if sensing that a specific voice is inputted through voice recognition during voice recording.

According to an embodiment of the present application, the operation of determining a silence duration of a voice and displaying the silence duration on the touchscreen of the electronic device 100 visually divides and displays a duration being set as the silence duration in a region displaying a playback state.

According to an embodiment of the present application, the operation of storing the analyzed voice data and the list of playback durations of the voice data stores a list of silence durations playing or not playing according to user's setting at the time of playing recorded data and, if playing after storing the recorded data, plays the remnant duration except the silence duration according to the stored list.

According to an embodiment of the present application, the electronic device analyzes audio information included in media data at the time of media data recording or playback according to previously set information, and determines the analyzed audio information as one or more durations, and provides media data composed of a duration desired by a user.

Various embodiments describing the present invention can be carried out through one or more programs included in the memory 110 of the electronic device 100, or can be directly controlled by the processor 122. Also, they may be controlled through one or more control modules controlled by the processor 122.

Methods according to embodiments disclosed in claims and/or specification of the present invention can be implemented in a form of hardware, software, or a combination of hardware and software. In a case of implementing in the software form, a computer-readable storage medium storing one or more programs (i.e., software modules) can be provided. One or more programs stored in the computer-readable storage medium are configured to be executable by one or more processors within the electronic device 100. The one or more programs can include instructions for enabling the electronic device 100 to execute the methods according to the various embodiments disclosed in the claims and/or specification of the present invention.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Also, the programs can be stored in a memory configured by a combination of some or all of them. Also, each configuration memory may be included in plural number.

The programs can also be stored in an attachable storage device accessible to the electronic device 100 through a communication network such as the Internet, an intranet, a Local Area Network (LAN), a Wireless LAN (WLAN) and a Storage Area Network (SAN) or a communication network configured by a combination of them. This storage device can access the electronic device 100 through an external port.

Also, a separate storage device on a communication network may access a portable electronic device 100.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising:
   detecting audio information from all or some of media data;
   determining a setting duration as at least one duration which satisfies a reference condition using the audio information; and
   displaying the setting duration on a display.

2. The method of claim 1, further comprising:
   playing a remnant duration of the media data except the setting duration.

3. The method of claim 1, further comprising:
   playing the setting duration from the media data.

4. The method of claim 1, further comprising:
   storing information about the setting duration in the media data.

5. The method of claim 4, further comprising:
   choosing a different duration of the media data based on the information about the setting duration stored in the media data.

6. The method of claim 1, wherein determining the setting duration comprises choosing a duration of a voice which is matched to a reference voice stored in a database.

7. The method of claim 6, wherein choosing the duration of the voice comprises determining voice information corresponding to the voice; and
   wherein displaying the setting duration comprises displaying at least part of the duration of the voice.

8. The method of claim 1, wherein the reference condition is preset and determines at least one of a specified frequency range of the audio information, a time of maintaining of the audio information on the specified volume range, and a specified amplitude range of the audio information.

9. The method of claim 1, wherein the setting duration is determined based on at least one of a silence duration of maintaining for a specified time, a white noise duration of maintaining for a specified time, and a voice duration corresponding to a specified voice.

10. The method of claim 1, further comprising:
    storing, as separate data, the media data except the setting duration.

11. The method of claim 1, wherein the reference condition is changeable.

12. An electronic device comprising:
    a touchscreen configured to display setting information;
    a memory configured to store data about the setting information in the electronic device;
    at least one processor configured to detect audio information from all or some of media data, to determine a setting duration as at least one duration which satisfies a reference condition using the audio information, and to display the setting duration on a display.

13. The electronic device of claim 12, wherein the processor is configured to play a remnant duration of the media data except the setting duration.

14. The electronic device of claim 12, wherein the processor is configured to play the setting duration from the media data.

15. The electronic device of claim 12, wherein the processor is configured to store information about the setting duration in the media data.

16. The electronic device of claim 15, wherein the processor is configured to choose a different duration of the media data based on the information about the setting duration stored in the media data.

17. The electronic device of claim 12, wherein the processor is configured to choose a duration of a voice which is matched to a reference voice stored in a database.

18. The electronic device of claim 17, wherein the processor is configured to determine voice information corresponding to the voice, and to display at least part of the duration of the voice.

19. The electronic device of claim 18, wherein the processor is configured to preset the reference condition which determines at least one of a specified frequency range of the audio information, a time for maintaining of the audio information on the specified volume range, and a specified amplitude range of the audio information.

20. The electronic device of claim 19, wherein the processor is configured to determine the setting duration based on at least one of a silence duration of maintaining for a specified time, a white noise duration of maintaining for a specified time, and a voice duration corresponding to a specified voice.

21. The electronic device of claim 12, wherein the processor is configured to store, as separate data, the media data except the setting duration.

22. The electronic device of claim 12, wherein the processor is configured to change the reference condition.

* * * * *